Patented Sept. 17, 1929

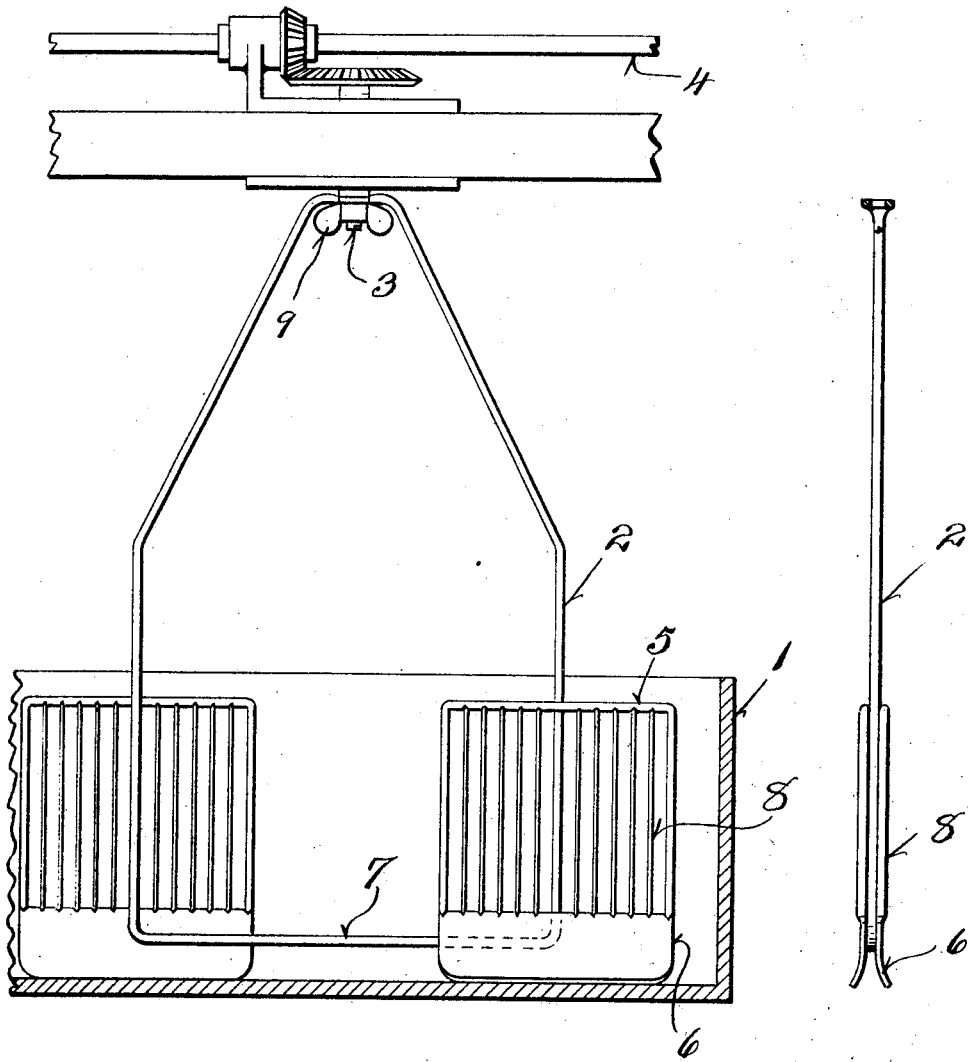

1,728,637

UNITED STATES PATENT OFFICE

GUSTAV STOELTING, OF KIEL, WISCONSIN, ASSIGNOR TO STOELTING BROTHERS CO., OF KIEL, WISCONSIN

CHEESE AGITATOR

Application filed March 22, 1928. Serial No. 263,647.

The invention relates to cheese agitators.

Objects of this invention are to provide a novel form of cheese agitator which is adapted to operate upon the curd during the process of cooking, and to keep it thoroughly agitated and scraped clear of the bottom of the vessel and thoroughly broken up into small particles. In this way an homogeneous mass is provided and one in which every portion is completely and thoroughly treated.

Further objects are to provide a novel form of agitator which is of very simple and reliable construction, which is easy to produce, and which is easy to keep clean.

An embodiment of the invention is shown in the accompanying drawings in which:

Figure 1 is a fragmentary view partly in section showing the agitator in place in the vat;

Figure 2 is an end view of the agitator with a part of its upper end broken away.

Referring to the drawings, it will be seen that the agitator is adapted to operate within a vat 1. This agitator is formed of a main frame having side bars 2 which converge to the upper end and are secured to a driving shaft 3 operated in any suitable manner as, for example, by means of gearing from the line shaft 4. The agitator is provided with two small or auxiliary frames 5 which have relatively heavy marginal portions, and which are provided with plate-like scoops or scrapers 6 at their lower ends. These scoops are turned in opposite directions as is evident from a comparison of Figures 1 and 2. The main frame arms 2 are positioned rearwardly of each of the auxiliary frames. It is preferable to join the frame arms 2 of the main frame by means of a transverse spacing bar 7 which is preferably formed integral with the arms 2.

It is to be understood that one only of the agitators has been shown. Other agitators identically like the one illustrated are employed, and the number employed, of course, depends upon the length of the vat.

The scrapers 6 are oppositely curved at their lower ends, as shown, so that they will always present the scraping or curved face towards the mass of curds when the agitator main frame is rotated in the proper direction.

Between the scrapers or scoops 7 and the upper bar of each of the auxiliary frames 5, a plurality of tines or relatively small bars 8 are secured. The purpose of these bars or tines is to break up the chunks of curd which are scraped up by the scoops 6 and which are encountered by the auxiliary frames of the agitator.

With a device of this type, it is a very easy matter to keep the mass of curds thoroughly agitated and broken up during the cooking process. If desired, the main frame may be provided with an apertured upper end held in place by means of a thumb nut 9.

Further, it is to be noted that the device is very simple to construct and is easy to keep clean.

Although the invention has been described in considerable detail, such description is intended as illustrative rather than limiting as the invention may be variously embodied and as the scope of such invention is to be determined as claimed.

I claim:

1. A cheese agitator comprising a main frame having spaced parallel arms, a pair of auxiliary frames carried by the spaced arms, each of said auxiliary frames having a scraper at its lower end adapted to scrape up the curd, and having means above said scraper for breaking the curd into small particles.

2. A cheese agitator comprising a driving shaft, a main frame engaged with the shaft and including parallel side bars, auxiliary frames attached to the side bars at one side thereof, each of said auxiliary frames having a heavy marginal portion, oppositely disposed curved scraper blades at the lower ends of said auxiliary frames and relatively small bars extending between the scraper blades and one end of the auxiliary frames.

3. A cheese agitator comprising a driving shaft, a main frame removably suspended from said driving shaft and having parallel side bars, a pair of auxiliary frames carried by said side bars, said auxiliary frames having a heavy marginal portion and having oppositely curved scrapers at their lower ends, and a plurality of vertical bars extending from the scraper of each auxiliary frame to the upper portion thereof.

4. A cheese agitator comprising a driving shaft, a main frame removably suspended from the driving shaft and including parallel side bars, a transverse spacing bar connecting the outer ends of said side bars, auxiliary frames carried by the side bars each having a heavy marginal portion, oppositely curved scraper blades at the lower ends of said auxiliary frames and disposed upon opposite sides of the transverse spacing bar, and a plurality of tines extending between the inner edge of the scraper blades and the upper end of the auxiliary frames.

In testimony that I claim the foregoing I have hereunto set my hand at Kiel, in the county of Manitowoc and State of Wisconsin.

GUSTAV STOELTING.